March 20, 1973  C. E. BARNES  3,721,652
POLYMERS OF 2-PYRROLIDONE

Filed Sept. 3, 1970  3 Sheets-Sheet 3

CARL E. BARNES
INVENTOR.

BY Jesse D. Reingold

ATTORNEY

United States Patent Office 3,721,652
Patented Mar. 20, 1973

3,721,652
POLYMERS OF 2-PYRROLIDONE
Carl E. Barnes, New Canaan, Conn., assignor to Radiation Research Corporation, Stamford, Conn.
Continuation-in-part of application Ser. No. 763,898, Sept. 30, 1968, which is a continuation-in-part of application Ser. No. 711,926, Mar. 11, 1968. This application Sept. 3, 1970, Ser. No. 69,471
Int. Cl. C08g 20/16
U.S. Cl. 260—78 P                17 Claims

ABSTRACT OF THE DISCLOSURE 2-pyrrolidone is polymerized to a new white, high molecular weight polymer being particularly suitable for melt extrusion into fibers, films and other shaped articles. A continuous process of polymerization is described.

---

The present application is a continuation-in-part of my earlier application Ser. No. 763,898, filed Sept. 30, 1968, now abandoned, which, in turn, was a continuation-in-part of my earlier application Ser. No. 711,926, filed Mar. 11, 1968, now abandoned.

This invention relates to the polymerization of 2-pyrrolidone.

Methods for the polymerization of 2-pyrrolidone to form polypyrrolidone have been previously disclosed, for example, in U.S. Pats. 2,638,463, 2,809,958 and 2,891,038. In general, these methods involve the polymerization of 2-pyrrolidone in the presence of an alkaline polymerization catalyst, if desired with an activator.

The polymer formed from 2-pyrrolidone is believed to be a linear polyamide, which has come to be known as nylon-4, having the structure:

The polymer may be shaped into ribbons, films, molded articles and fibers. Because of its hydrophilic properties, which closely resemble those of cotton and silk, nylon-4 fiber has long been recognized as having great commercial potential. For example, fabrics made from nylon-4, in contrast with other presently available synthetic fibers, are as readily dyed as cotton; they may be ironed at cotton temperatures; they rapidly dissipate static charges; and, in particular, they possess the comfort of cotton and wool.

Nylon-4 fiber has never been made commercially however, primarily because efforts to manufacture the fiber by the economical melt spinning method have met with almost universal failure. As disclosed in U.S. Pat. 3,076,774, for example, the high temperatures required for the melt spinning process have resulted in decomposition of the polymer, and aside from low yields, the quality of the melt spun fiber has been inferior. Consequently, it has been necessary to resort to either dry or wet spinning methods employing a solution of the polymer in a suitable solvent. Solvents for nylon-4 are often expensive and recovery systems are costly. The result has been that even though nylon-4 is potentially low in cost, the fibers made from solution have been of poor quality or prohibitively expensive.

It is an object of this invention to provide polymers of 2-pyrrolidone that can be converted into useful shaped articles, such as fibers, filaments, rods, bristles, films, ribbons and the like, by the inexpensive method of melt extrusion.

A further object of this invention is to provide polymers of 2-pyrrolidone that will retain their desirable properties after melt extrusion.

A further object of the invention is to provide a white polymer of 2-pyrrolidone that can be subjected to melt extrusion.

Still another objection of the invention is to provide a high molecular weight polymer having a narrow molecular weight distribution, substantially free of detrimental low molecular weight material.

Further objects and advantages of the invention will be apparent from the description of the invention which follows hereafter.

In general, the objects of the invention are carried out by providing a fiber-forming polymer of 2-pyrrolidone capable of forming white fiber by melt extrusion and having the ability, after a 5 gram sample is held at 270° C. under a pressure of $6.7 \times 10^6$ dynes/cm.$^2$ in a Slocumb melt indexer having a single hole spinnerette of 20 mils in diameter and 80 mils in length and having a 250-mesh stainless steel screen on top of the spinnerette and a 50-mesh stainless steel screen on top of the 250-mesh screen for 4 minutes, to form a continuous filament for at least 3 minutes after the spinnerette hole is opened.

The polymers of 2-pyrrolidone of the present invention characteristically have an inherent viscosity of at least about 2, e.g. at least about 2.5, and range as high as about 8 to about 10 deciliters per gram, whereas the prior art polymers have not achieved such high viscosities. The polymers of the present invention have a preferred range of inherent viscosity of from about 3 to about 5.

As used herein, inherent viscosity is defined as equal to $$\frac{2.303}{C} \log \frac{t_s}{t_o}$$

where

C=concentration of polymer in solvent in grams per deciliter
$t_s$=flow time of solution
$t_o$=flow time of pure solvent Inherent viscosity is reported herein in terms of a 0.5 g./dl. solution of polymer in anhydrous hexafluoroisopropanol at 30° C., unless otherwise stated. In the examples, Cannon-Fenske tubes Nos. 100, 150 and 200 were used to obtain the viscosity measurements.

The polymers of 2-pyrrolidone of the present invention exhibit a marked increase in heat stability as compared to prior art polymers, which is particularly important in the formation of fibers by melt extrusion.

The first United States patent describing polymers of 2-pyrrolidone issued in 1953. While polymers of 2-pyrrolidone have been extensively investigated ever since then, there has never been a disclosure of polymers of 2-pyrrolidone having the characteristics of the new polymers of the present invention.

The new polymer of 2-pyrrolidone of the present invention is ideally suited for melt extrusion into films or fibers. The new polymer of the invention may also be used as a molding powder. Shaped articles made from the new polymer of the invention, whether molded products films or fibers, show greatly improved strength characteristics while at the same time retaining the other superior physical properties characteristic of polymers of 2-pyrrolidone.

It is also a feature of the new polymer of the invention that, while the molecular weight of the polymer is markedly increased, it is still a white polymer meeting the highest standards of whiteness. This is indeed remarkable, since prior art attempts to obtain high molecular weight polymer usually led to a yellowish or otherwise discolored nylon-4 polymer. Another remarkable aspect of the present invention is that the high molecular weight and white color are consistently obtained, thereby making possible, for the first time, the commercial production of melt-spinnable nylon-4- polymer.

The new polymer of the invention can be prepared by polymerizing 2-pyrrolidone using an alkaline polymerization catalyst in the presence of $CO_2$. For example, polymerization can be effected by bubbling $CO_2$ through a mixture of 2-pyrrolidone and an alkali metal salt of 2-pyrrolidone, e.g. sodium or potassium pyrrolidonate, the alkali metal pyrrolidonate functioning as an alkaline polymerization catalyst.

The new polymer of the invention can also be prepared by reacting $CO_2$ with the alkali metal salt of 2-pyrrolidone to form an adduct of $CO_2$ and the alkali metal pyrrolidonate, and then polymerizing the 2-pyrrolidone monomer in the presence of the adduct.

The art has not considered carbon dioxide to be an "activator" for the polymerization of 2-pyrrolidone, and although virtually every oxygen-containing compound has been proposed as an activator, there has never been a proposal to use carbon dioxide in the polymerization of 2-pyrrolidone. Indeed, while U.S. Pat. 2,907,755 proposed the use of carbon monoxide as a co-catalyst (activator) in the polymerization of 2-pyrrolidone, it does not mention any other compound to be used to activate the catalyst.

Carbon dioxide has been used as an activator, or co-catalyst, in the polymerization of lactams having 6 or more carbon atoms in the ring, in the presence of alkali metals, particularly sodium metal, as the catalyst. See, for example, S. Chrzczonowicz, and B. Ostaszewski, Bull. Acad. Polon, Sci., Ser. Sci. Chim 13 (2), 85–8 (1965), which describes the polymerization of Zetaenantholactam in the presence of either carbon dioxide or an acyl lactam as the activator. See also Mezdunar, Simpozium P. Makromolekul. Khim., Dokl. Moscow 1960, Sekteiya 2, 497–503 in which Chrzczonowicz et al. describe the polymerization of caprylolactam, enantholactam, and caprolactam using sodium metal and carbon dioxide. Based on this work, British Pat. 1,060,747 describes the polymerization of laurolactam in the presence of sodium metal and carbon dioxide. A further patent showing the use of carbon dioxide in the polymerization of higher lactams is Japanese patent publication 11,541/60, which describes the polymerization of caprolactam using an alkali metal hydroxide and carbon dioxide. However, there has never been a proposal of a polymer of 2-pyrrolidone having the thermal stability characteristics of the polymer of the present invention. Further, there exists a number of patents that require that carbon dioxide be deliberately excluded from the polymerization of 2-pyrrolidone. See for example, Example 1 and other examples of U.S. Pat. 3,158,589. Although I do not wish to be bound by any theory for my invention, nevertheless it appears that the prejudice against the use of carbon dioxide in the polymerization of 2-pyrrolidone was because it was believed to have a detrimental effect on the catalyst.

As stated above, the polymerization of 2-pyrrolidone is carried out using an alkaline polymerization catalyst in the presence of $CO_2$. The reaction conditions for the polymerization of 2-pyrrolidone are essentially the same as that already described in the prior art. In general, 2-pyrrolidone monomer may be polymerized at a temperature from 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous non-solvent, such as hydrocarbon, is suitable, as described in U.S. Pat. 2,739,959.

The alkaline polymerization catalyst can be any of those used in polymerizing 2-pyrrolidone, such as those disclosed in previously mentioned U.S. Pat. 2,638,463, except that I do not use the alkali metals or any other agent that may reduce the sensitive 2-pyrrolidone ring thereby introducing impurities which may be harmful to the polymerization reaction. Suitable alkaline polymerization catalysts are derivatives of the alkali metals, e.g. the hydroxides and oxides of the alkali metals. The alcoholates of the alkali metals, such as sodium methylate, may also be used with good results.

In addition, the oxides and hydroxides of the alkaline earth metals, for example, calcium and barium, may be used as catalysts. Also, organic metallic compounds, preferably those which are strongly basic, may be used, such as lithium, potassium and sodium alkyls, e.g. butyl lithium, and the aryls of the alkali metals, such as sodium phenyl and sodium amide. The alkaline polymerization catalyst may be a quaternary ammonium base as described in U.S. Pat. 2,973,343 of the formula:

wherein $R_1$, $R_2$ and $R_3$ are lower alkyl radicals and $R_4$ is an alkyl, aryl or aralkyl radical. Tetramethyl ammonium hydroxide is a preferred alkaline polymerization catalyst, since I have obtained high molecular weight polymer through its use with carbon dioxide. Further, as previously mentioned, the catalyst may be an alkali metal hydride, such as sodium hydride, as described in U.S. Pat. 3,075,953. While certain alkali metal derivatives can be used, many of them are undesirable. For example the alkali metal carbontaes as well as the alkaline earth metal hydroxides tend to be insoluble and for this reason are undesirable. Lithium hydroxide (monohydrate) also is insoluble in 2-pyrrolidone.

The catalyst may be used in an amount of about 0.5 to about 50% by weight or higher, based on the 2-pyrrolidone monomer, preferably 5 to 30 wt. percent, most preferably 8 to 20 wt. percent.

The preferred proportions of $CO_2$ and alkaline polymerization catalyst has been found to be about 2 to 4 mols of the catalyst per mol of $CO_2$. The temperature at which the $CO_2$ is added to the catalyst may be varied widely, good results having been obtained at temperatures ranging from 18° C. (approximately the freezing point of the solution of the catalyst in monomer) to 130° C. or higher.

A preferred alkaline polymerization catalyst is the alkali metal salt of 2-pyrrolidone, e.g. sodium or potassium pyrrolidonate. When $CO_2$ is bubbled through a reaction mixture of 2-pyrrolidone monomer and the alkali metal pyrrolidonate catalyst, an adduct of $CO_2$ and alkali metal pyrrolidonate is formed. It has been found that this adduct can be used in the polymerization when alkali metal pyrrolidonate is also present.

I have found that the polymerization is best carried out by bubbling $CO_2$ through a mixture of the 2-pyrrolidone monomer and alkali metal pyrrolidonate in the ratio of about one-quarter to about one-half mol of $CO_2$ per mol of alkali metal pyrrolidonate, although more or less $CO_2$ can be used. If larger amounts of $CO_2$ are used, e.g. more than one-half mol of $CO_2$ per mol of alkali metal pyrrolidonate, the additional $CO_2$ may not be readily absorbed. If smaller amounts of $CO_2$ are used, e.g. 2 mols of alkali metal pyrrolidonate per 0.5 mol of $CO_2$, the reaction mixture will comprise 2-pyrrolidone monomer, alkali metal pyrrolidonate and the $CO_2$-alkali metal pyrrolidonate adduct. Good results are obtained in general, by stopping the addition of the $CO_2$ just short of absolute saturation, although this is not essential. Best results are obtained by using somewhat less than ½ mol of $CO_2$ per mol of alkali metal pyrrolidonate, such as a ratio of ¼ to ⅜ mol of $CO_2$ per mol of the pyrrolidonate. In any case, the reaction mixture is then placed in a polymerization vessel to polymerize the monomer with or without further addition of $CO_2$.

If desired the reaction between $CO_2$ and alkali metal pyrrolidonate can be carried out before contact with the bulk of the 2-pyrrolidone monomer.

It is presently preferred to carry out the polymerization of 2-pyrrolidone in the following manner. First, the 2-pyrrolidone monomer is reacted with an alkali metal hydroxide, preferably NaOH or KOH, the water formed in the reaction being removed by distillation, so as to form in situ an anhydrous solution of the alkali metal salt of the 2-pyrrolidone in the 2-pyrrolidone to be polymerized. Instead of the alkali metal hydroxide, the alkali metal pyrrolidonate can be formed using an alkali metal alcoholate, preferably $NaOCH_3$ or $KOCH_3$, to form a solution of alkali metal pyrrolidonate in 2-pyrrolidone. Any source of alkali metal can be used to form the pyrrolidonate, provided that undesired by-products are not formed and that the sensitive pyrrolidone ring is not destroyed. Undesired by-products are those that act as polymerization inhibitors. Sodium metal is an example of a source of alkali metal that should not be used. After removal of water from the reaction mixture, $CO_2$ is bubbled through to form the alkali metal pyrrolidonate-$CO_2$ adduct in situ, thereby starting the polymerization. If desired, additional 2-pyrrolidone monomer can be added to the alkali metal pyrrolidonate solution before introduction of the $CO_2$.

Suitably, the 2-pyrrolidone monomer will be contacted with 0.01 to 10 wt. percent of $CO_2$, based on the weight of the 2-pyrrolidone monomer. Presently preferred amounts are 0.2 to 6 wt. percent, based on the weight of the 2-pyrrolidone, while 0.5 to 5 wt. percent are the most preferred amounts.

The amount of carbon dioxide can also be expressed as a mol percent of the mols of alkaline polymerization catalyst. The amount of carbon dioxide would thus be from about 0.06 to 60 mol percent, based on the mols of the alkaline polymerization catalyst, but higher amounts, e.g. up to about 80 mol percent $CO_2$ based on the mols of alkaline polymerization catalyst have been used. Generally, the amount of $CO_2$ on a molar basis will be from 10 to 80 mol percent, based on the mols of alkaline polymerization catalyst.

It is possible to introduce $CO_2$ into the system other than by bubbling $CO_2$ into the mixture of 2-pyrrolidone and alkaline polymerization catalyst. For example, the source of $CO_2$ can be a compound that will transfer $CO_2$ to the mixture of 2-pyrrolidone monomer and alkaline polymerization catalyst, provided that the anion remaining after loss of $CO_2$ from the compound is not deleterious to the polymerization. Adducts of carbon dioxide and an alkali metal or quaternary ammonium pyrrolidonate can be added to a mixture of 2-pyrrolidone monomer and alkaline polymerization catalyst, as can adducts of $CO_2$ and an alkali metal or quaternary ammonium caprolactamate, with or without any $CO_2$ gas added to the system. These adducts are added to the system on the same weight basis as the $CO_2$.

A convenient method for preparing the adducts is to bubble $CO_2$ through an anhydrous mixture of the pyrrolidonate and 2-pyrrolidone under vacuum until there is a sharp rise in pressure indicating that the $CO_2$ is no longer being readily absorbed. The adduct is precipitated by adding benzene or other organic precipitant to the solution. There is recovered from the precipitate a free-flowing, nonhygroscopic, white powder. Alternatively, the organic precipitant can be added to an anhydrous solution of pyrrolidonate in 2-pyrrolidone before the $CO_2$ is bubbled through the solution, in which case the precipitate forms as the $CO_2$ is absorbed.

Since it is necessary to react $CO_2$ with anhydrous pyrrolidonate, it is preferred to form the $CO_2$-pyrrolidonate adduct by adding $CO_2$ to an anhydrous solution of pyrrolidonate in 2-pyrrolidone, where the pyrrolidonate is formed in situ as described above.

In a similar manner, the adduct of $CO_2$ and caprolactamate is formed by bubbling $CO_2$ through an anhydrous solution of caprolactamate in caprolactam and adding the organic precipitant before or after the $CO_2$ addition. Generally, when the caprolactamate is formed in situ, temperatures in excess of 90° C. are avoided.

I prefer to utilize the polymerization catalyst with carbon dioxide as the sole polymerization activator, although other polymerization activators may be used in conjunction with carbon dioxide. When this is done, polymers having bilobal molecular weight distribution curves are formed, the carbon dioxide causing the formation of a peak in the high molecular weight area of a molecular weight distribution curve and the other activator causing the formation of a peak in the lower molecular weight area.

Other activators which may be used in conjunction with carbon dioxide are the acyl compounds discussed in previously mentioned U.S. Pat. 2,809,958, e.g., organic acyl peroxides, carboxylic acid anhydrides, lactones, lactides, N-acyl derivatives of lactams, acyl halides, and alcohol esters of carboxylic acids.

In addition, any of the following activators may be used:

| Activator: | Described in U.S. Pat. |
|---|---|
| Carbon disulfide | 2,912,415 |
| N-substituted secondary amides | 3,016,366 |
| Cyanuric chloride | 3,022,274 |
| Organic isocyanates | 3,028,369 |
| Adipimide | 3,033,831 |
| N-iminopyrrolidones | 3,040,004 |
| N-monocarbonyl pyrrolidone and organic acid amide | 3,042,659 |
| Aromatic carbonyl and organic acid amide | 3,060,153 |
| Chlorine, bromine, N-bromopyrrolidone, or N-chloropyrrolidone | 3,061,593 |
| $NO_2$ or organic nitrite | 3,069,392 |
| $P_2O_5$ and other oxides or Group V elements | 3,135,719 |
| N,N-disubstituted ureas | 3,148,174 |
| Halides and oxyhalides of sulfur and phosphorous | 3,158,589 |
| Oxides of Group VI elements | 3,174,951 |
| Halosilanes | 3,180,855 |
| Benzenephosphorus dichloride, benzene phosphorous oxychloride, phosphorous trichloride, thionyl chloride | 3,210,324 |

When it is desired to use one of these activators along with $CO_2$, I prefer to use acetyl pyrrolidone, adipyl dipyrrolidone or phenylisocyanate. When employed, the activator may be used in an amount of 0.001 to 25% by weight, based on the 2-pyrrolidone monomer, preferably 0.01 to 5 wt. percent, most preferably 0.1 to 3 wt. percent.

It is desirable to carry out the polymerization in the substantial absence of water, although anhydrous conditions are not essential; e.g. the amount of water should not exceed about 0.1% by weight of the 2-pyrrolidone monomer.

It is preferred that the 2-pyrrolidone monomer be purified, e.g. by fractional distillation under reduced pressure or by recrystallization or a combination of both. Distillation at about 80° to 150° C. under reduced pressure, such as about 0.5 to about 50 mm. Hg, has been found suitable.

A preferred purification technique, and one that was used in the following Experiment A and Examples 1–6, is as follows. Commercially available 2-pyrrolidone is subjected to aqueous caustic hydrolysis to hydrolyze impurities such as amides and esters, and primarily to hydrolyze any amides of 1,4-diaminobutane. Good results have been obtained by using 20 grams of potassium hydroxide (reagent grade) and 100 grams of water per liter of 2-pyrrolidone. The mixture is boiled under reflux for 15 minutes to 24 hours, preferably 8 to 12 hours, and then the distillate is recovered.

The distillate is treated with acid (5 cubic centimeters of phosphoric acid per liter of distillate has been employed), and distilled, and the new distillate is treated with caustic (e.g. 20 grams KOH pellets per liter) and distilled once more. This final distillation from caustic removes any phosphoric acid or oxide that may be carried over from the preceding distillation. The inclusion of a recrystallization step before the final distillation from caustic is even more effective but this was not done in the monomer used in the examples.

The following specific examples are intended to illustrate the invention more fully and are not intended to limit its scope.

The examples refer to the drawings in which.

EXPERIMENT A

This illustrates the effect of carrying out the polymerization of 2-pyrrolidone without the addition of $CO_2$.

1105 grams (13 mols) were polymerized as follows:

810 grams of purified 2-pyrrolidone which had been purified was placed in a flask equipped for vacuum distillation and 33 grams of potassium hydroxide pellets of 85% assay (0.5 mol) were added. The flask was swept with dry nitrogen, placed under reduced pressure and then 230 cc. (255 grams) of 2-pyrrolidone were distilled over to remove the water formed by the reaction of the potassium hydroxide with the 2-pyrrolidone to form the potassium salt.

The vacuum was broken with dry nitrogen and the solution then transferred while still hot (to minimize moisture pick-up) to a polymerization vessel and tightly capped. It was then allowed to cool to near room temperature. During the cooling period the originally colorless solution containing the potassium salt developed a pale yellow color believed to be due to the very brief contact with air during the transfer.

When the potassium salt solution was cool there was added to it a solution of 12.7 grams (0.1 mol) of N-acetyl pyrrolidone dissolved in 550 grams of dry purified 2-pyrrolidone. The vessel was immediately shaken to insure rapid mixing and within a period of 3 minutes the mixture became cloudy and set to a firm gel. (Less pure monomer may require longer to reach the gel stage.)

After standing in an oven maintained at 45–55° C. for four days, the solid cake was removed from the polymerization vessel, broken up into smaller pieces, and placed in a Waring Blendor with water. After 5–10 minutes stirring the powdered polymer was washed with water until free of alkali and then dried in a vacuum oven. The inherent viscosity was 1.8 deciliters per gram. Attempts to spin this polymer failed since it was so fluid on melting that it dripped through the spinnerette and did not form filaments.

A sample of the dried polymer was analyzed by gel permeation chromatography, using m-cresol as the solvent. In this regard the polymer was dissolved in m-cresol after heating the mixture of polymer and m-cresol for about 40 minutes at 150° C. (the gel perémeation curve indicated no degradation as the result of this procedure).

The molecular weight distribution was found to be as follows:

| Counts | Height | Chain length (A.) | Cumulative wt. percent |
| --- | --- | --- | --- |
| 12 | 1 | 350,000 | 100 |
| 13 | 1.5 | 180,000 | 99 |
| 14 | 2.5 | 85,000 | 97 |
| 15 | 6 | 42,000 | 94 |
| 16 | 7.5 | 21,000 | 87 |
| 17 | 8 | 10,000 | 78 |
| 18 | 7.5 | 5,000 | 69 |
| 19 | 6 | 2,500 | 60 |
| 20 | 7 | 1,200 | 53 |
| 21 | 10 | 600 | 44 |
| 22 | 12.5 | 290 | 33 |
| 23 | 8 | 144 | 18 |
| 24 | 4 | 56 | 8 |
| 25 | 3 | 19 | 4 |

The average number molecular size (An) was 237 angstroms and the average weight molecular size (Aw) was 16,496 angstroms, and the dispersity ratio ($Mw/Mn$), which is calculated by dividing Aw by An, was 69.44. The data in the table can be plotted as a curve and when this is done the broad distribution indicated by the very high dispersity ratio $Mw/Mn=69.44$ may readily be seen.

EXPERIMENT B

This experiment was carried out exactly the same as Experiment A with the exception that the polymerizing mixture was allowed to remain in the oven at 45–55° C. for a period of seven days. The polymer obtained from this experiment was found to have an inherent viscosity of 2.1 dl./g. By gel permeation chromatography the average number molecular size was determined to be 128 A. and the average weight molecular size was 2462 A. The ratio $Mw/Mn$ was 19.16.

It was found that this material could be melt spun only if special precautions were taken to minimize the dwell time by spinning at a high rate of speed. Filaments could be formed under these conditions although considerable degradation occurred. The fibers resulting had inferior properties, namely low tensile strength (2.5 g./d.), serious fibrilation and poor wet strength, particularly in hot water.

EXPERIMENT C

This experiment demonstrates the unsatisfactory results obtained when 2-pyrrolidone is polymerized using sodium metal and $CO_2$.

200 grams (2.35 mols) of dry, purified pyrrolidone (taken from the same batch as that used in Example 4) was placed in a 500 milliliter flask equipped with a gas inlet tube as well as connections to a manometer and a vacuum pump. 5.7 grams (0.25 mol) of sodium metal, freshly cut into small pieces, was added and dry nitrogen immediately introduced through the gas inlet tube both to agitate the pieces of sodium and to prevent contact with air and moisture. Care was taken to maintain the temperature of the mixture between 35° and 40° C. while the sodium was reacting. Experience has shown that at higher temperatures the reaction becomes vigorous, causing local overheating, melting of the sodium and subsequent charring of the monomer in the vicinity of the metal.

The reaction continued steadily with evolution of hydrogen gas for a period of seven hours, after which time all the sodium had dissolved, indicating that it had reacted to form sodium pyrrolidonate.

The connection to the gas inlet tube was then changed to a supply of dry carbon dioxide, the pressure lowered to 30 mm. of mercury, and the gas admitted. 2500 cc. (0.13 mol) of the carbon dioxide was added and at the end of the addition the pressure was still 30 mm. Hg indicating that all the gas was absorbed. Dry nitrogen was then added to bring the pressure to 10 mm. Hg above atmospheric and the contents of the flask were transferred to a polymerization vessel. The vessel was capped, placed in an oven maintained at 55° C. for a period of seven days. At the end of this time the mixture was in the form of a gel, which was filtered and the solid washed with water until free of alkali, and dried in a vacuum oven. The yield was 6.4 grams or 3.2%. The inherent viscosity was 0.90 dl./g. By gel permeation chromatography the average number molecular size (An) was found to be 179 A. and the average weight molecular size (Aw) was found to be 2761 A. The dispersity ratio, $Mw/Mn$, was 15.45. This polymer was completely unsatisfactory for melt spinning.

The following examples illustrate the present invention:

EXAMPLE 1

This example was carried out exactly as was the experiment described in Experiment A with the exception that while the solution of the dried potassium 2-pyrrolidone was still hot and immediately after the 230 cc. of 2-pyrrolidone had been distilled over to insure dryness, approximately 500 cc. of dry $CO_2$ gas (equal to about 1 gram) was introduced into the distillation vessel by evacuating to remove all nitrogen and then admitting the $CO_2$. The solution was then allowed to cool to room temperature under the $CO_2$ atmosphere. When cool, dry nitrogen was then admitted to bring the pressure back to equal that of the atmosphere and then the procedures of Experiment A were again followed.

The polymer obtained from this experiment had an inherent viscosity of 2.0 dl./g. It was much lighter in color than the polymer formed as described in Experiment A. This product was found to melt spin fairly well with some degradation but fibers having good tenacity were formed. At a draw ratio of 4.0 the tenacity of fibers made from this polymer was 4.3 g./d.; elongation at break was 21%; the initial modulus was 23 g./d.; the yield stress was 4 g./d. and the yield strain was 12%.

The gel permeation chromatograph curve obtained from this polymer was bilobal, definite peaks occurring at counts 19 and 23 as indicated in the following table:

| Counts | Height | Chain length (A.) | Cumulative wt. percent |
| --- | --- | --- | --- |
| 15 | 8 | 56,000 | 1^0 |
| 16 | 16 | 30,000 | 98 |
| 17 | 33 | 16,000 | 94 |
| 18 | 40.5 | 8,800 | 85 |
| 19 | 44.5 | 4,700 | 74 |
| 20 | 38.5 | 2,500 | 62 |
| 21 | 38 | 1,350 | 52 |
| 22 | 47.5 | 720 | 42 |
| 23 | 57 | 380 | 30 |
| 24 | 40 | 210 | 15 |
| 25 | 14 | 110 | 4 |
| 26 | 2.5 | 60 | 0.5 |

The average weight molecular size was 5890 A. the average number molecular size was 560 A., and the new polymer of this example had a dispersity ratio $Mw/Mn$ of 9.87.

EXAMPLE 2

552.5 grams (6.5 mols) of 2-pyrrolidone which had been carefully purified was placed in a flask equipped for vacuum distillation and 33 grams of potassium hydroxide pellets of 85% assay (0.5 mol) were added. The flask was swept with dry nitrogen, placed under reduced pressure and then the mixture was distilled to remove the water formed by the reaction of the potassium hydroxide with the 2-pyrrolidone to form the potassium salt. Bumping was prevented by bleeding in a small amount of the dry nitrogen through a capillary tube extending beneath the surface of the liquid. 255 grams (230 cc.) of the 2-pyrrolidone was distilled over to insure dryness.

$CO_2$ was bubbled through the hot potassium salt solution in the flask for three minutes without breaking the vacuum. The resulting $CO_2$-treated potassium salt solution was cooled to room temperature and then diluted with dry 2-pyrrolidone monomer to bring the total weight of solution to 500 grams. The 500 grams of solution was then mixed with 550.9 grams of dry 2-pyrrolidone monomer and 0.75 gram (0.006 mol) of acetyl pyrrolidone. The mixture gelled in 14 minutes. The gel was placed in an oven maintained at about 60° C. for 4 days. At the end of this period, the solid polymer was removed, broken up into smaller pieces and placed in a Waring Blender with water. After 5–10 minutes of stirring in the blender, the snow-white polymer was washed with water until free of alkali and then dried in a vacuum drier. The inherent viscosity of the polymer was found to be 3.20. Samples of this polymer were readily melt extruded into fibers and filaments.

The gel permeation curve of this sample was characterized by a single peak cresting at count 18, corresponding to a chain length of 5,000 angstroms, but having a long lower molecular weight tail from 18 to 24 counts.

The average weight molecular size of the new polymer was 9690 A., the average number molecular size was 2620 A., and the dispersity ratio was 3.70.

EXAMPLE 3

This illustrates the effect of carrying out the polymerization of 2-pyrrolidone with $CO_2$ as the only activator.

638 grams (7.5 mols) of 2-pyrrolidone which had been carefully purified was placed in a flask equipped for vauuum distillation and 16.5 grams of potassium hydroxide pellets of 85% assay (0.25 mol) were added. The flask was swept with dry nitrogen, placed under reduced pressure and then the mixture was distilled to remove the water formed by the reaction of the potassium hydroxide with the 2-pyrrolidone to form the potassium salt. Bumping was prevented by bleeding in a small amount of the dry nitrogen through a capillary tube extending beneath the surface of the liquid. 138 grams (125 cc.) of the 2-pyrrolidone was distilled over to remove the water and insure dryness. While the potassium salt solution was still hot, dry $CO_2$ gas was bubbled through for a period of three minutes without breaking the vacuum. The $CO_2$ was admitted into the solution by just cracking the needle valve of a commercial cylinder of dry $CO_2$. The solution was then blown by nitrogen pressure into a polymerization vessel, which had previously been swept out with dry nitrogen so that no air remained.

The polymerization vessel containing the $CO_2$-treated potassium salt solution was placed in an oven maintained at about 45–55° C. for 5 days, after which the solid cake was removed from the polymerization vessel, broken up into smaller pieces and placed in a Waring Blendor with water. After 5–10 minutes of stirring in the blendor the snow-white polymer was washed with water until free of alkali, then dried in a vacuum oven. The inherent viscosity was found to be 4.4 dl./g.

A sample of the dried polymer was analyzed by gel permeation chromatography, using m-cresol as the solvent. The molecular weight distribution was found to be as follows:

| Counts | Height | Chain length (A.) | Cumulative wt. percent |
| --- | --- | --- | --- |
| 14 | 4 | 85,000 | 100 |
| 15 | 16 | 42,000 | 96 |
| 16 | 28 | 21,000 | 83 |
| 17 | 33 | 10,000 | 59 |
| 18 | 24 | 5,000 | 30 |
| 19 | 8 | 2,500 | 10 |
| 20 | 3 | 1,200 | 3 |
| 21 | 0.5 | 600 | 0 |

These data can be plotted as a curve by plotting cumulative weight percent as a function of chain length. These data clearly show the narrow molecular weight distribution of the nylon-4 polymer of the present invention. There is an unusually large amount of high molecular weight chains, a virtual absence of lower molecular chains, and almost no chains of intermediate molecular weight. The narrow molecular weight distribution of the polymer of the character described above is, in effect, the definition of a very low dispersity ratio. Thus, the average number molecular size of the polymer was 7107 angstroms, the average weight molecular size was 17,802 A., and the dispersity ratio was 2.50. This compares to a dispersity ratio of 69.44 for the polymer obtained as described in Experiment A. When these data are plotted as a curve the narrow Gaussian distribution curve can readily be seen. The low molecular weight species which causes the difficulty in melt spinning is completely absent.

The nylon-4 polymer thus produced was easily pulled into long fibers from a molten mass in a test tube. The molecular weight distribution of this nylon-4 polymer is very similar to that of commercial fiber-forming polymers, such as nylon-6, nylon-66 and polyethylene terephthalate. In contrast to prior art nylon-4 polymers, the nylon-4 polymer thus produced has the special characteristics required to enable it to be readily melt extruded.

EXAMPLE 4

800 cc. of purified monomer (taken from the same batch as the material used in Experiment C) was added to a 2,000 milliliter flask equipped with a gas inlet and a condenser set up for vacuum distillation with connections to a manometer as well as a source of both carbon dioxide and dry nitrogen.

33 grams (0.5 mol) of Reagent grade potassium hydroxide pellets of 85% assay was added and a flow of dry nitrogen immediately started. The pressure was then reduced to about 30–35 mm. Hg, allowing a small amount of nitrogen to be admitted and the mixture heated to boiling. 350 cc. of monomer was distilled over to insure the removal of the water formed by the reaction of the potassium hydroxide with the 2-pyrrolidone to form the potassium salt. Heating was stopped and a small amount of dry nitrogen admitted to raise the pressure and hence stop the boiling immediately.

The mixture was then cooled immediately to room temperature, leaving a colorless solution of anhydrous potassium 2-pyrrolidone (0.5 mol) is 458.5 grams (5.7 mols) of monomer. The pressure was then lowered to 20 mm. Hg and the connection to the vacuum pump sealed off. 5000 cc. (0.225 mol) of dry carbon dioxide gas contained in a 5 liter flask at atmospheric pressure was then admitted to the sealed system. The entire amount of gas was absorbed by the liquid with no change in pressure. Dry nitrogen was then added to bring the pressure in the system to 10 mm. Hg above the atmospheric pressure and the mixture was then transferred to a polymerization vessel, which was capped and placed in an oven maintained at 55° C. for 6 days. At the end of this time the hard cake was removed, ground in a Wiley mill, washed until free of alkali, and then dried in a vacuum oven.

The weight after grinding was 413.7 grams and after washing and drying was 285.0 grams, which corresponds to a conversion of 69%. The inherent viscosity was 3.4 dl./g. By gel permeation chromatography the average number molecular size was found to be 1783 A. and the average weight molecular size was found to be 6803 A. The dispersity ratio $M_w/M_n$ was 3.41. This polymer was found to be entirely satisfactory for melt spinning, whereas the polymer produced from the same batch of monomer used in Experiment C was unsatisfactory.

Examples 5(a) and (b) are submitted below to illustrate the superior properties of the nylon-4 polymer of the invention.

EXAMPLE 5(a)

Five grams of a yellowish nylon-4 polymer of the prior art having an inherent viscosity of 2.2, which was produced in Experiment B using acetyl pyrrolidone as the activator for the polymerization, was placed in a Slocumb Melt Indexer modified to include a single hole spinnerette in the bottom and having a 250-mesh stainless steel screen on top of the spinnerette and a 50-mesh stainless steel screen on top of the 250-mesh screen. This nylon-4 polymer is typical of the best nylon-4 polymer previously available to melt spinning. The polymer was heated under pressure to 270° C., and held for a period of 4 minutes with the spinnerette hole closed. At the end of this period, the spinnerette hole was opened, but only a few drops of liquid emerged accompanied by considerable vapor. No fiber could be formed.

EXAMPLE 5(b)

The procedure of Example 5(a) was followed using a 5 gram sample of the nylon-4 polymer produced in Example 3. At the end of the 4 minutes of heating at 270° C., the spinnerette hole was opened, and a strand of fiber emerged. The fiber continued to emerge for 7 minutes at which time all of the 5 gram sample had been spun into fiber.

The single fiber thus produced, after orientation, had a tensile strength of 6 g./d., elongation at break of 15%, and an initial modulus of 35–40 g./d. In normal melt spinning, much less drastic conditions are used, and consequently fibers made by melt spinning nylon-4 of the present invention will have much better properties than shown above.

This Slocumb Melt Indexer test described above subjects the nylon-4 polymer to conditions of drastic severity for nylon-4. A nylon-4 polymer that can pass this test by being capable of spinning fiber after the 4 minute heating at 270° C. will have all of the properties required to eliminate all of the difficulties heretofore encountered in melt spinning nylon-4. It is to be noted that prior art nylon-4 vaporized under the conditions of this test. The results of this test are summarized in the following table:

MELT RHEOMETRY

| Sample | Shear stress, dynes/cm.$^2$ | Melt viscosity, poises | Temp., ° C. | Extrusion time, min. | Remarks |
|---|---|---|---|---|---|
| Experiment B | 3.0×10$^6$ | 260 | 270 | 1.1 | Could not collect fibers. |
| Experiment B | 3.0×10$^6$ | 320 | 270 | 1.3 | Do. |
| Example 3 | 6.7×10$^6$ | 8,400 | 270 | 7.4 | Fibers collected. |
| Example 3 | 6.7×10$^6$ | | 270 | 6.9 | Do. |

Figure 1:
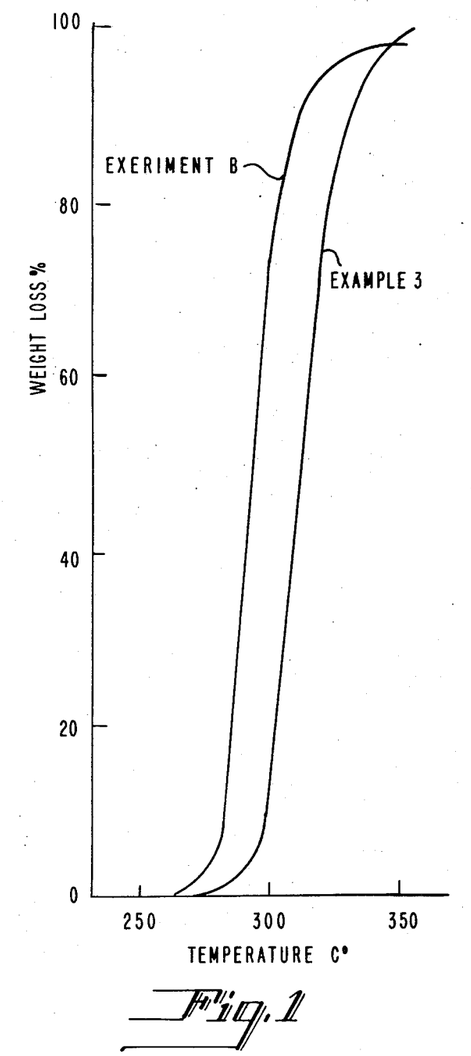
FIG. 1 is a graph plotting weight loss versus temperature for the polymers of Experiment B and Example 3.

A conventional thermogravimetric analysis (TGA) of the polymer obtained from Experiment B as the control showed a pronounced difference in the thermal stabilities of the two polymers. The TGA apparatus was programmed for a temperature rise of 9° C. per minute, and the weight loss was measured as a function of temperature. The data are given in FIG. 1. The shapes of the TGA curves for the two polymers are essentially identical, but the curve for the polymer from Example 3 is about 20° C. higher than that for the control, Experiment B, demonstrating an important difference in the thermal stability of the two polymers. At a temperature of about 275° C. (approximately the operating temperature for fiber spinning), the rate of decomposition of the control was rapid, but there was no detectable decomposition of the polymer from Example 3 at this temperature. The rate of decomposition of the polymer from Example 3 did not become rapid until the temperature reached about 300° C.

Figure 2:
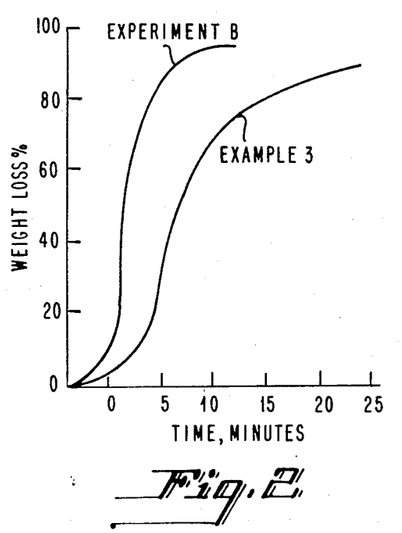
FIG. 2 is a graph plotting weight loss at 275° C. versus time for the polymers of Experiment B and Example 3.

A further comparison of the thermal stabilities of the two polymers was made by a TGA procedure in which the samples were heated to 275° C. as rapidly as possible and held at this temperature. Weight loss was measured as a function of time, and the data obtained are shown in FIG. 2. These demonstrate a dramatic difference in the heat stabilities of the two polymers. After 3 minutes (about the residence time of the nylon-4 in melt spinning equipment under conditions used in previous work), the weight loss of the polymer from Example 3 was approximately 10% whereas the loss of the control, Experiment B, was about 80%.

Figure 3A:
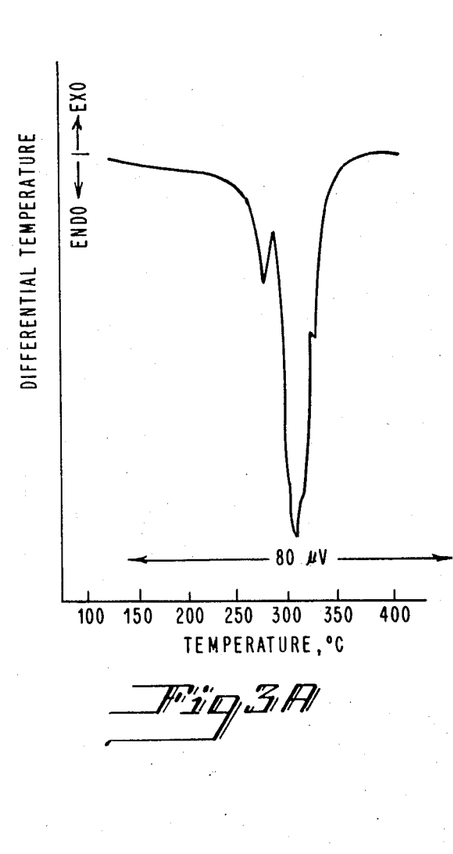
FIG. 3A shows a differential thermogram of the polymer of Example 3.
Figure 3B:
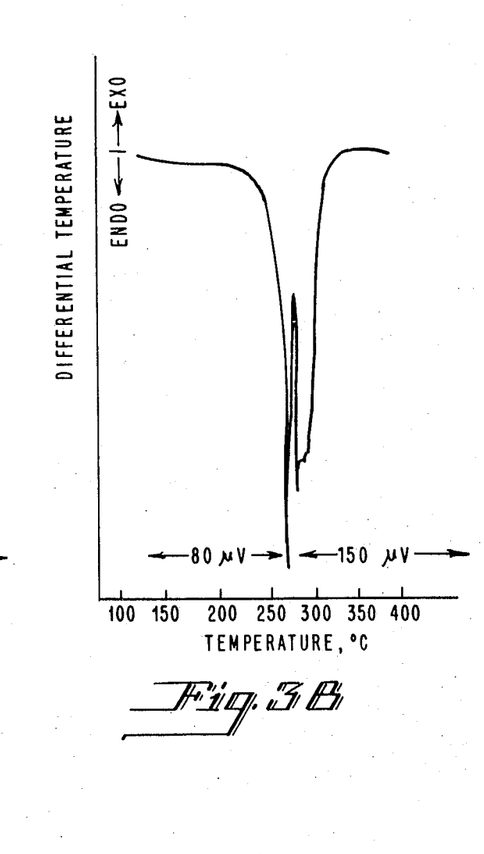
FIG. 3B shows a differential thermogram of the polymer of Experiment B.

The charts for the differential thermal analyses (DTA) of the two polymers (FIGS. 3A and 3B) also demonstrate a significant difference in thermal stability. The locations of the peaks on the temperature scale are of the greatest significance. The magnitudes of the differential temperatures have no significance since the sample sizes were different. Both polymers have a melting endoderm at about 275° C., and a second endoderm indicating decomposition. The peak of the decomposition endotherm for the polymer from Example 3 is shown in FIG. 3A to be at about 310° C., whereas the peak of this endoderm for the control, Experiment B, is shown in FIG. 3B to be at about 285° C.

EXAMPLE 6

600 grams of purified 2-pyrrolidone was added to 1,000 ml. flask equipped with a gas inlet tube and a condenser set up for vacuum distillation and with connections to a full scale manometer (reading up to 760 mm. Hg of mercury) as well as to a source of dry nitrogen and dry carbon dioxide.

20 grams (0.3 mol) of potassium hydroxide pellets of 85% assay was added and a flow of dry nitrogen gas immediately started. The pressure was reduced to about 30-35 mm. of mercury and the mixture heated to boiling. A small amount of nitrogen was allowed to pass through to prevent bumping. 200 cc. of monomer was distilled over to remove the water formed by the reaction of the potassium hydroxide with the 2-pyrrolidone to form the potassium salt. Heating was then stopped and the flow of nitrogen was increased momentarily to raise the pressure and hence stop the boiling immediately.

The mixture was then cooled to near room temperature, leaving a completely colorless solution of anhydrous potassium pyrrolidonate (0.3 mol) in 315 grams (3.7 mols) of monomer. The pressure was then lowered to 20 mm. Hg and dry $CO_2$ admitted from a cylinder. The $CO_2$ was rapidly and completely absorbed at first as indicated by the fact that the pressure did not change. A point was reached after about 5½ minutes when the pressure rose abruptly. When it reached 770 mm. Hg (a positive pressure) the system was opened to the air and the flow of $CO_2$ continued for another 5 minutes to insure that no unreacted potassium salt remained.

The mixture was then poured into a polymerization vessel which was capped and placed in an oven maintained at 55° C. for 5 days. At the end of this time the hard cake that had formed was removed, ground in a Wiley mill, washed with water several times and then dried in a vacuum oven. The conversion to polymer was found to be 55% and the inherent viscosity of the polymer was 4.10 dl./g. This polymer was very satisfactory for melt extruding to form both fibers and films.

The average weight molecular size of the polymer was 16220 A., the average number molecular size was 4606 A., and the dispersity ratio was 3.52.

The polymer of Example 1 had a bilobal molecular weight distribution curve; that of Example 2 had a skewed molecular weight distribution curve; and those of Examples 3, 4 and 6 had a Gaussian molecular weight distribution curve.

EXAMPLE 7

To a round bottom 500 ml. flask equipped with a thermometer, a gas inlet tube, a stirrer and a Claisen distillation head leading through a condenser to a vacuum source, was charged 264 g. 2-pyrrolidone and 20.4 g. of KOH pellets (85% assay). The flask was evacuated to pump capacity using a nitrogen bleed (3 mm. Hg). The reaction mass was heated to about 120° C. over a period of about 30 minutes so as to remove the water formed without distilling monomer. The contents of the flask where then cooled to about 30° C. The nitrogen bleed was then cut off and carbon dioxide added until there was a rise in pressure in the flask indicating that the carbon dioxide was fully absorbed. At this point, the $CO_2$ flow was cut off, the pressure brought to atmospheric with nitrogen and the contents were placed in a polymerization oven maintained at 50° C.

The conversion was 60% and the polymer inherent viscosity was 3.7 deciliters per gram. After washing the polymer with water, acid and water, the maximum initial rate of decomposition at 300° C. was determined as 13.0 percent per minute and the time to 90% decomposition at 300° C. as 13.1 seconds. This polymer was readily melt-extruded at 4 pounds per hour to a white polymer having a tenacity of more than 6 grams per denier.

EXAMPLE 8

One-hundred samples of the new nylon-4 of the present invention were subjected to TGA measurements. The results are reported in Table II below:

TABLE II

| | Lowest value | Highest value | Average of all 50 points |
|---|---|---|---|
| Maximum initial rate of decomposition at 300° C.(percent/minute) | 11.5 | 16 | 14.7 |
| Time to 90% decomposition at 300° C. (minutes) | 10 | 14 | 12.2 |

These polymers were readily melt-spun at 4 pounds per hour to form white fiber having a tenacity in excess of 6 grams per denier.

The maximum initial rate of decomposition and the time to 90% decomposition reported in Examples 7 and 8 were determined using a Du Pont Thermogravimetric Analyzer, Model 950, operated isothermally at 300° C. The maximum initial rate of decomposition is determined by calculating the steepest slope of the curve of percent decomposition versus time. By way of comparison, prior art polymers of 2-pyrrolidone are much less thermally stable than the new nylon-4 of the present invention.

The polymer samples of Examples 7 and 8 were prepared for TGA measurements as follows:

(1) Wash with water to remove excess monomer and residual base to obtain a stable pH of about 7;

(2) Form a slurry of about 2 grams of polymer per 75-100 cc. of water and add sufficient 0.1 N HCl to obtain a stable pH of 4.5-5.0;

(3) Wash with water to remove acid to obtain a stable pH of about 7; and (4) Dry polymer to constant weight.

The term "stable pH" is intended to mean a pH that remains constant for 15 minutes, the pH measurement being taken on a sample of 10 grams of polymer and 90 grams of water that have been slurried together for 10 minutes.

One desirable aspect of the present invention is the continuous polymerization of 2-pyrrolidone.

Figures 4, 5:
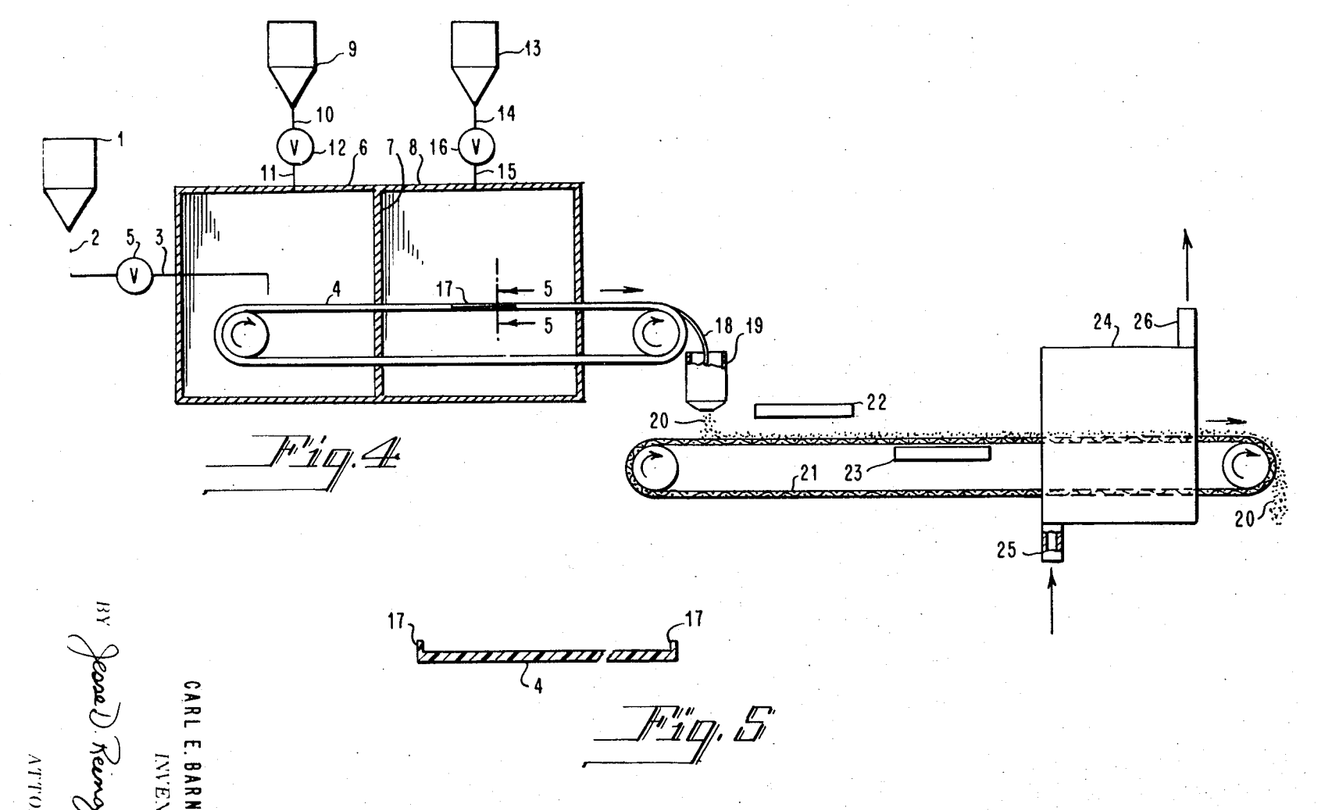
FIG. 4 is a schematic illustration of process and apparatus for continuous polymerization of nylon-4.
FIG. 5 is an enlarged section taken along the lines 5—5 in FIG. 4.

FIGS. 4 and 5 are schematic illustrations of the apparatus for and process of the continuous polymerization of the invention.

Referring now to FIG. 4, a mixture of 2-pyrrolidone monomer and polymerization catalyst is withdrawn from supply tank 1 and passed through lines 2 and 3 onto the surface of an endless conveyor 4. Valve 5 controls the amount of mixture deposited on conveyor 4. The upper reach of conveyor 4 passes through gas-tight reaction chamber 6, partition 7, and polymerization chamber 8.

The upper reach of conveyor 4 passes out of polymerization chamber 8 and, after passing around a reversing wheel not shown, returns as the lower reach and retraces in reverse the path taken by the upper reach. Reaction chamber 6 is connected to a source of $CO_2$ gas 9 by means of lines 10 and 11 and valve 12. Polymerization chamber 8 is connected to a source of nitrogen gas 13 by means of lines 14 and 15 and valve 16. Partition 7 is provided with openings not shown to permit the upper and lower reaches of conveyor 4 to pass between chambers 6 and 8. Any suitable sealing means (not shown) can be used to seal the openings in partition 7 and chamber 8 through which the conveyor 4 passes.

The conveyor 4 is made of flexible material and, as shown in FIG. 5, has edges 17 sufficiently high to support a layer of the monomer and catalyst of between about 1 mm. and 10 mm. Conveyor 4 is made of a material that will withstand the polymerization temperatures employed in chamber 8. For the polymerization of 2-pyrrolidone, polypropylene is suitable for the conveyor 4, while for higher lactams polytetrafluoroethylene or stainless steel may be required.

The chambers 6 may be made of any suitable material, such as stainless steel, plastic or glass lined, lacquered or otherwise treated carbon steel, or a rigid plastic, depending on the temperature requirements of the lactam to be polymerized in the molten state. The principal requirement of the material chosen is to be inert or unaffected by dry carbon dioxide gas.

In operation, carbon dioxide is withdrawn from tank 9 and fills the chamber 6. An anhydrous solution of the alkali metal salt of the lactam, e.g. sodium or potassium pyrrolidonate dissolved in the molten lactam, e.g. pyrrolidone, is withdrawn from tank 1 and introduced into chamber 6 so that a layer is formed in conveyor 4 in a thickness of from 1 mm. to 10 mm. or more, the preferred thickness being from 1 to 5 mm. and most preferred being from 2 to 4 mm. The speed of the conveyor 4 and the length of the chamber 6 is adjusted so that during the passage of the conveyor 4 through the chamber 6, the alkali metal salt dissolved in the molten lactam reacts completely with the carbon dioxide and polymerization is initiated.

Alternatively, the carbon dioxide withdrawn from tank 9 may be diluted with dry nitrogen gas and the contact time adjusted by the speed of the conveyor 4 and length of the chamber 6 so that the reaction with the alkali metal salt in solution is incomplete, leaving a controlled amount of the unreacted alkali metal salt catalyst in excess.

As a further alternative, carbon dioxide can be fed from tank 9 directly into tank 1, in which case chamber 6 can be dispensed with by removing partition 7.

Upon leaving the chamber 6, the layer of lactam carried on conveyor 4 enters polymerization chamber 8 which is maintained at an optimum polymerization temperature. For 2-pyrrolidone a temperature of 30–70° C. has been found suitable, the preferred temperature being 40–60° C. and most preferred 45–55° C. For epsilon-caprolactam the preferred temperature is from 125–200° C. with 130–170° C. being preferred and 140–160° C. most preferred.

It is desirable to keep the polymerization chamber 8 purged with nitrogen from tank 13 during the cycle and imperative that no moisture be allowed to enter.

At the end of the polymerization cycle the lactam may be converted to polymer to any predetermined extent, such as from 30–90% or more with a preferred conversion being from 50–75%. The cake 18 thus formed will leave the endless belt at the end of the cycle being at this point self-supporting. The cake 18 then passes to a comminuting means 19, such as a crusher, chopper or grinder, where it is reduced to any desired size. It may be passed through a series of comminuting means, if desired.

The chips 20 resulting from the comminuting operation are then carried by a conveyor 21 and passed under a washing means 22, such as a water spray head using water at any desired temperature. Conveyor 21 is made of a perforated metal or alternatively is made of a plastic screen. The washing step removes the alkaline catalyst as well as unconverted monomer which may be recovered.

At the end of the washing step, the chips pass over a suction area 23 to remove excess water and then to a drying chamber 24. Chamber 24 is provided with an inlet 25 adapted to be connected to a source of heated gas, such as $CO_2$ or $N_2$, which is blown through chamber 24 to effect rapid drying of the chips. Vent 26 permits the heated gas to leave the chamber 24. Vent 26 can be connected to a vacuum source (not shown), if desired. After leaving the chamber 26 the chips leave conveyor 21 and the chips are ready to be fed to a melt extruder to be shaped into fibers, filaments or films. Alternatively, the chips can be packaged for use as a molding powder.

In Examples 9, 11 and 13 which follow, the inherent viscosity was determined at 25° C. in a 0.5 g./dl. solution of polymer in anhydrous hexafluoroisopropanol.

EXAMPLE 9

Pyrrolidone (25 ml.) and 5.56 g. of $(CH_3)_4NOH \cdot 5H_2O$ (9 mol percent based on the 2-pyrrolidone) were heated under vacuum to incipient distillation while removing the water formed, then cooled to 23° C. Carbon dioxide was bubbled into the solution at low pressure. The polymerizate was poured into a polyethylene bottle and stored at 50° C. This was repeated in a second run. Table III below reports the results of the polymerizations.

TABLE III

| Run | Polymerization time (hrs.) | Conversion (percent) | Inherent viscosity (dl./g.) |
| --- | --- | --- | --- |
| 1 | 5 | 50 | 7.8 |
|   | 29 | 57 | 8.0 |
| 2 | 7 | 51 | 8.2 |
|   | 29 | 54 | 6.9 |
|   | 97 | 58 | 7.4 |

This shows that quaternary ammonium salts of 2-pyrrolidone are exceptionally active alkaline polymerization catalysts, giving both very high polymerization rates and very high viscosity polymer.

EXAMPLE 10

Ten grams of KOH pellets (85% assay) were added to 110 g. (100 ml.) of pyrrolidone and the mixture was heated under vacuum to incipient monomer distillation to remove water. The mixture was cooled to 35° C. and diluted with 250 ml. of dry benzene (dried over Na metal). A clear solution resulted. A stream of $CO_2$ was then bubbled into the benzene solution for about 25 minutes causing precipitation of a white product. The benzene-monomer solution was pumped out through a sintered glass tube, and the benzene-insoluble product was washed with two 50-ml. portions of dry benzene and two 100-ml. portions of dry n-hexane. The product was transferred to a Soxhlet extractor and extracted with refluxing hexane for 6.5 hr. to free the product of monomer. The product was dried in a vacuum desiccator to yield 17.2 g. of a non-hygroscopic, free-flowing white powder.

Table IV below reports the results obtained above (Run No. 2) and results obtained using different amounts of 2-pyrrolidone following the above procedure.

TABLE IV

| Run No. | 1 | 2 | 3 | 4 |
| --- | --- | --- | --- | --- |
| Amount of 2-pyrrolidone, ml | 50 | 100 | 250 | 1,000 |
| Amount of KOH, g | 5.1 | 10 | 25 | 76.8 |
| Mol percent KOH, based on 2-pyrrolidone | 10.8 | 10.5 | 10.5 | 9.0 |
| Heating time, min | 20 | 25 | 25 | 40 |
| Maximum temp., ° C | 111 | 120 | 138 | 125 |
| Yield of precipitate, g | 9.3 | 17.2 | 42.0 | 145 |

EXAMPLE 11

The benzene-insoluble CO$_2$-pyrrolidonate adduct recovered from Run No. 2 of Example 10 was used in the polymerization of 2-pyrrolidone as follows:

20 ml. of 2-pyrrolidone were heated under vacuum with 1.45 g. of KOH (85% assay) to incipient distillation conditions while removing water. To the resulting anhydrous solution was added 0.80 g. of the CO$_2$ adduct recovered from Run No. 2 of Example 10. The polymerizate was placed in an oven maintained at 50° C.

Two additional runs were made using different amounts of KOH and CO$_2$ adduct. The results are reported in Table V below.

TABLE V

| Run | Pyrrolidone Ml. | Pyrrolidone Mmol | KOH G. | KOH Mmol | CO$^2$ adduct (g.) | Polymerization time (hrs.) | Conversion (percent) | Inherent viscosity (dl./g.) |
|---|---|---|---|---|---|---|---|---|
| 1 | 20 | 251 | 1.45 | 17.7 | 0.80 | 24 | 37.0 | 3.8 |
|   |    |     |      |      |      | 48 | 40.0 | 3.6 |
| 2 | 20 | 251 | 0.98 | 11.9 | 1.60 | 24 | 34.0 | 3.5 |
|   |    |     |      |      |      | 48 | 44.0 | 3.5 |
| 3 | 20 | 251 | 0.53 | 6.4  | 2.40 | 24 | 18.0 | 3.1 |
|   |    |     |      |      |      | 48 | 38.0 | 3.4 |

EXAMPLE 12

Following the procedure of Example 10, 100 ml. of 2-pyrrolidone and 10.5 mol percent sodium hydroxide were reacted under vacuum while removing water to form a solution of sodium pyrrolidonate in 2-pyrrolidone. The only deviation was to maintain the mixture of NaOH and 2-pyrrolidone at 113° C. and 7 mm. Hg for about 1 hour to effect complete dissolution of the NaOH. After addition of CO$_2$ and precipitation with dry benzene, a white powder essentially identical to the CO$_2$ adduct of Example 10 was obtained.

EXAMPLE 13

50 ml. of 2-pyrrolidone and 3.85 g. KOH (85% assay) were heated under vacuum to incipient distillation conditions while removing water to form an anhydrous solution of potassium pyrrolidonate in 2-pyrrolidone. A 25-ml. aliquot of the solution was pipetted out and added under nitrogen to 1.03 g. of the carbonated sodium pyrrolidonate of Example 12. The polymerizate was shaken well and stored at 50° C. After 24 hours, the conversion was 28% and the inherent viscosity was 4.6 dl./g.; after 48 hours, the conversion was 47% and the inherent viscosity was 4.4 dl./g.

EXAMPLE 14

Following the procedure of Example 10, 68 grams of caprolactam and 8.5 grams of KOH (85% assay) were heated at 90° C. and 7 mm. Hg for 30 minutes while removing water but without distilling caprolactam. Carbon dioxide was added to the mixture until the pressure started to sharply rise, at which time the CO$_2$ flow was cut off. The pressure was brought to atmospheric with dry nitrogen gas, and 120 ml. toluene was added. The reaction mass was refluxed for 20 minutes at 95–100° C., after which the product was filtered out and dried at 60° C. in a vacuum oven. 12.2 grams of a white, non-hygroscopic powder were obtained.

EXAMPLE 15

85 grams of 2-pyrrolidone and 8.5 grams of KOH (85% assay) were heated under vacuum while removing water but without distilling 2-pyrrolidone. To this anhydrous solution of potassium pyrrolidonate in 2-pyrrolidone was added 5 g. of the white powder of Example 14, and the mixture stirred under nitrogen for about 30 minutes. The polymerizate was transferred to polyethylene bottles and stored at 50° C. The results are reported below in Table VI.

TABLE VI

| Polymerization time (hrs.): | Conversion (percent) | Inherent viscosity (dl./g.) |
|---|---|---|
| 17 | 15 | 3.9 |
| 24 | 36 | 4.8 |
| 41 | 38 | 4.5 |

What is claimed is:

1. A homopolymer of 2-pyrrolidone in solid form capable of forming white fiber by melt extrusion and having the ability after a 5-gram sample is held for four minutes at 270° C. under a pressure of 6.7×10$^6$ dynes/cm.$^2$ in a Slocumb melt indexer having a single hole spinnerette of 20 mils in diameter and 80 mils in length and having a 250-mesh stainless steel screen on top of the spinnerette and a 50-mesh stainless steel screen on top of the 250-mesh screen to form a continuous filament for at least 3 minutes after the spinnerette hole is opened.

2. The polymer of claim 1 having the ability to form a continuous filament for at least about 7 minutes.

3. The polymer of claim 1, having an inherent viscosity of from about 3 to about 5 dl./g. in terms of a 0.5 g./dl. solution of polymer in anhydrous hexafluoroisopropanol at 30° C.

4. A melt-extrudable polymer of 2-pyrrolidone according to claim 1 having been obtained by polymerization of 2-pyrrolidone in the presence of carbon dioxide as a polymerization activator.

5. A fiber of polypyrrolidone made from the polymer of claim 3.

6. A process for the production of a polymer of 2-pyrrolidone in solid form, which comprises polymerizing 2-pyrrolidone in the presence of an alkaline polymerization catalyst and at least 0.01% by weight of carbon dioxide, based on the weight of the 2-pyrrolidone monomer.

7. A process according to claim 6, wherein the 2-pyrrolidone is reacted with a source of alkali metal that will not reduce the pyrrolidone ring, said source of alkali metal being used in an amount less than the stoichiometric amount necessary to convert all the 2-pyrrolidone to the alkali metal pyrrolidonate, and water formed during the reaction is removed to leave an anhydrous solution of the alkali metal pyrrolidonate in 2-pyrrolidone, the solution is contacted with carbon dioxide, and the 2-pyrrolidone is polymerized in said solution.

8. The process of claim 7, wherein the alkali metal hydroxide is selected from the group consisting of sodium hydroxide, potassium hydroxide, sodium methylate, potassium methylate and tetramethyl ammonium hydroxide.

9. The process of claim 7, wherein the amount of said carbon dioxide is from about ¼ to ½ mol of carbon dioxide per mol of alkaline polymerization catalyst.

10. The process of claim 7, wherein the amount of said carbon dioxide is from 10 to 80 mol percent carbon dioxide, based on the mols of alkaline polymerization catalyst.

11. The process of claim 7, wherein the amount of said carbon dioxide is from 0.2 to 6 weight percent, based on the weight of the 2-pyrrolidone monomer.

12. A process for the production of a polymer of 2-pyrrolidone in solid form, which comprises polymerizing 2-pyrrolidone in the presence of a catalyst system consisting essentially of an alkaline polymerization catalyst and carbon dioxide.

13. The process of claim 12, wherein the amount of said carbon dioxide is at least 0.01% by weight, based on the weight of the 2-pyrrolidone monomer.

14. The process of claim 12, wherein the amount of said carbon dioxide is from about ¼ to ½ mol of carbon dioxide per mol of alkaline polymerization catalyst.

15. The process of claim 12, wherein the amount of said carbon dioxide is from 10 to 80 mol percent carbon dioxide, based on the mols of alkaline polymerization catalyst.

16. The process of claim 12, wherein the amount of said carbon dioxide is from 0.2 to 6 weight percent, based on the weight of the 2-pyrrolidone monomer.

17. A process for the production of a polymer of 2-pyrrolidone in solid form, comprising polymerizing 2-pyrrolidone in the presence of an alkaline polymerization catalyst and an adduct of carbon dioxide and a lactam salt selected from the group consisting of alkali metal and quaternary ammonium salts of 2-pyrrolidone and of caprolactam.

References Cited

UNITED STATES PATENTS

| | | | |
|---|---|---|---|
| 3,174,951 | 3/1965 | Taber | 260—78 P |
| 3,017,393 | 1/1962 | Ney | 260—78 P |
| 3,026,301 | 3/1962 | Ney | 260—78 P |
| 3,052,654 | 9/1962 | Roth et al. | 260—78 P |
| 3,072,615 | 1/1963 | Riedesel | 260—78 P |
| 3,158,589 | 11/1964 | Glickman et al. | 260—78 P |
| 3,383,367 | 5/1968 | Black et al. | 260—78 P |
| 3,405,099 | 10/1968 | Taber | 260—78 P |
| 2,241,321 | 5/1941 | Schlack | 260—78 L |
| 2,638,463 | 5/1953 | Ney et al. | 260—78 P |
| 2,907,755 | 10/1955 | Lautenschlager et al. | 260—78 L |
| 3,171,829 | 3/1965 | Wiesner et al. | |
| 3,397,185 | 8/1968 | Tetenbaum | 260—78 L |

HAROLD D. ANDERSON, Primary Examiner

U.S. Cl. X.R.

260—33.4 R; 264—176 F

PO-1050
(5/69)

UNITED STATES PATENT OFFICE
CERTIFICATE OF CORRECTION

Patent No. 3,721,652          Dated March 20, 1973

Inventor(s) Carl E. Barnes

It is certified that error appears in the above-identified patent and that said Letters Patent are hereby corrected as shown below:

Column 4, line 31, change "carbontaes" to -- carbonates --

Column 7, line 74, change "peremeation" to -- permeation --

Column 10, line 27, change "vauuum" to -- vacuum --

Column 14, line 8, change "where" to -- were --

Column 18, line 55, change "and" to -- any --

Signed and sealed this 20th day of November 1973.

(SEAL)
Attest:

EDWARD M. FLETCHER, JR.
Attesting Officer

RENE D. TEGTMEYER
Acting Commissioner of Patents